Patented Jan. 11, 1944

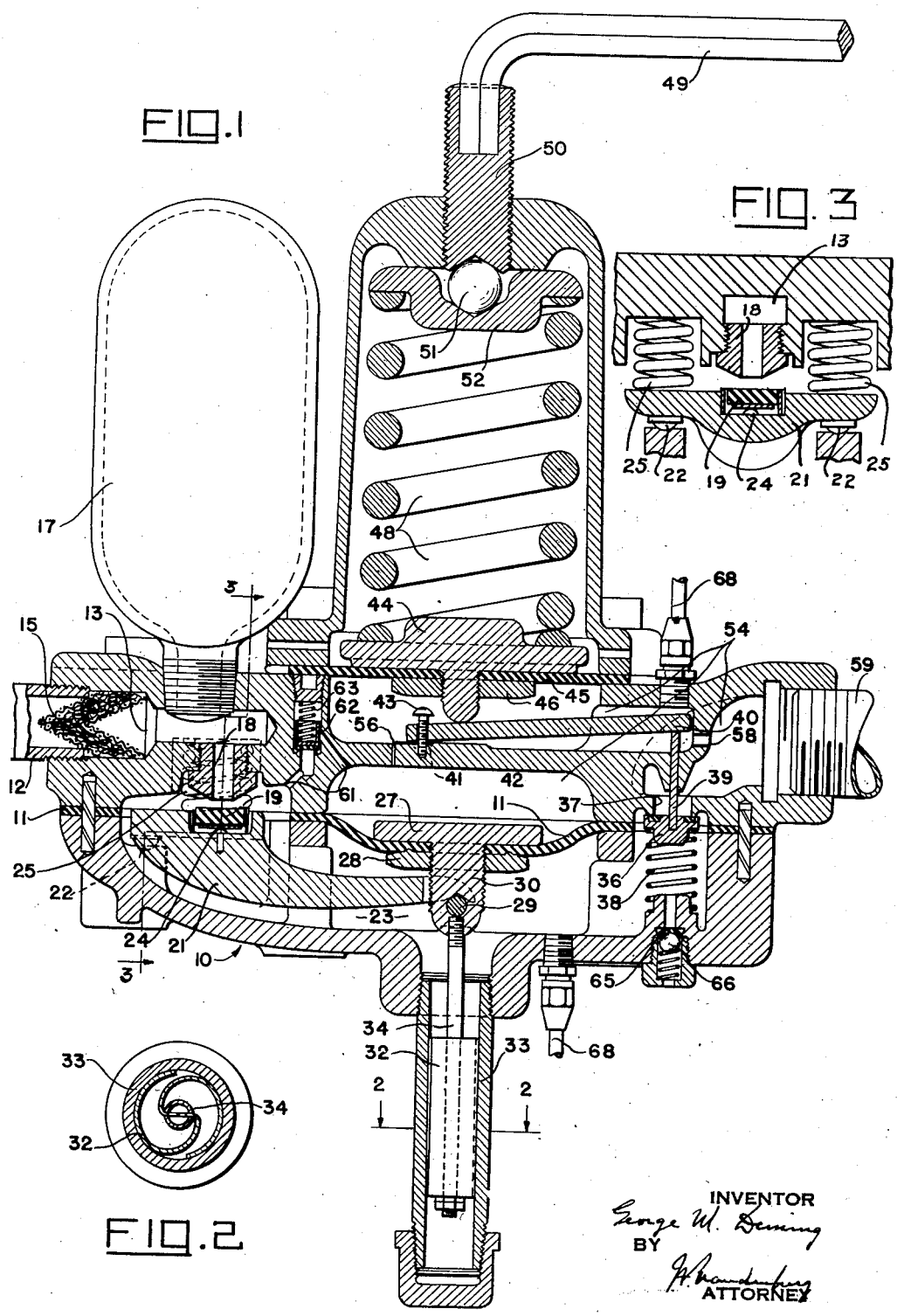

2,338,760

UNITED STATES PATENT OFFICE 2,338,760

PRESSURE REGULATOR

George M. Deming, Orange, N. J., assignor to Air Reduction Company, Incorporated, New York, N. Y., a corporation of New York Application June 17, 1941, Serial No. 398,377

9 Claims. (Cl. 50—11)

This invention relates to improvements in pressure regulators and more especially to two-stage regulators, which are in effect two regulators operated in series.

In its broadest aspect it is an object of this invention to provide an improved pressure regulator. More particular objects are to provide simple and effective means for stabilizing the operation of a regulator to prevent humming or chatter, and to provide an improved construction for two-stage regulators, especially those of the type in which the first and second-stage chambers are separated by a diaphragm that forms a part of the valve-actuating mechanism of the regulator.

In conventional regulators gas flows from a space where it is at high pressure through a passage or nozzle into a reduced-pressure chamber, the supply of gas through the passage being controlled by a valve. In a two-stage regulator of the type to which this invention is directed, the reduced-pressure chamber of the first stage is the space containing high-pressure gas for the second stage. A valve of the second stage of the regulator mechanism controls the supply of gas from the reduced-pressure chamber of the first stage to the reduced-pressure chamber of the second stage, and for purposes of the description and claims of this specification these reduced-pressure chambers are designated as the first-stage chamber and the second-stage chamber, respectively.

In accordance with one feature of this invention the diaphragm separates the first and second-stage chambers and is exposed on opposite sides to the pressure of both chambers, but the space immediately adjacent the diaphragm on at least one side of the diaphragm is separated from the remainder of the chamber by a partition with a hole so small that it throttles the passage of gas and causes a phase lag in the pressure changes of the bodies of gas on opposite sides of the partition. This phase lag tends to stabilize the operation of the regulator to prevent humming. A similar restricted opening can be used to produce a phase lag in the pressure changes of the gas that operates the second-stage diaphragm. A friction-brake damping device can be combined with this phase displacement feature to further stabilize the operation of the regulator.

Another object of the invention is to provide improved means for limiting the pressure differential between the first- and second-stage chambers of a two-stage regulator, especially one in which the chambers are separated by the diaphragm that operates the valve element of the first pressure stage. The invention includes a passage connecting the first- and second-stage chambers and a relief valve commanding this passage and operable independently of the valve that controls the ordinary supply of gas from the first- to the second-stage chambers. This relief valve is loaded by a spring which determines the maximum pressure differential that can exist between the chambers before the communicating passage will be opened.

Another feature of the invention relates to the combining of such an inter-chamber relief valve with another relief valve on one of the connected chambers, such as the first-stage chamber, for exhausting gas to the outside atmosphere if the pressure within the regulator exceeds a given gauge pressure. Such an excessive pressure rise can result from a leak past the regulator valve when the valve is in closed position.

Other objects, features, and advantages of the invention will appear or be pointed out as the specification proceeds.

In the accompanying drawing, forming a part hereof:

Fig. 1 is a sectional view through a regulator embodying the invention.

Fig. 2 is an enlarged sectional view on the line 2—2 of Fig. 1.

Fig. 3 is a vertical transverse section taken on the line 3—3 of Fig. 1.

The regulator includes a body 10 made in two sections that are fastened together by bolts or screws and that clamp a diaphragm 11 between them. A pipe 12 screws into an inlet passage 13 in the upper section of the regulator body. A filter 15 comprising glass wool confined between conical screen ends is located at the end of the pipe 12.

The regulator has a dead-end chamber for protecting the high-pressure valve element from a compression wave if the valve supplying high-pressure gas is opened suddenly. When the regulator is to be used with long high-pressure piping systems, the dead-end chamber is made in the form of a dome 17 of large capacity. This dome has a neck threaded into the body 10 and communicating with the inlet passage 13.

From the inlet passage 13 gas passes through a nozzle 18. A valve element 19 seats against the nozzle 18 and controls the supply of gas from the nozzle 18 into the first-stage pressure chamber of the regulator.

A first-stage lever 21 carries two inserted ball pivots 22 which work in seats that are formed in protuberances on the inside of a first-stage chamber 23 in the case or body of the regulator. The valve element 19 is carried by the lever 21 and rests on a ball pivot 24 on which the valve element 19 can rock to aline itself with the nozzle 18 and seat firmly against the lip of the nozzle.

There is a coil spring 25 on each side of the nozzle 18 (Fig. 3) urging the lever 21 away from the nozzle to move the valve element 19 into open position. Figs. 1 and 3 show the valve element 19 in open position.

The central portion of the diaphragm 11 is covered by a diaphragm plate 27 that is clamped against the diaphragm by a clamping nut 28. A pin 29 extends from both sides of a protruding stem 30 of the diaphragm plate. The lever 21 has a bifurcated end that extends on both sides of the stem 30 and bears against the pin 29. A friction brake damping device, comprising resilient spring-tempered brake shoes 32 coiled in a double spiral and confined in a tubular guide 33, is connected to the stem 30 by a rod 34.

A valve element 36 seats against the lip of a passage or nozzle 37 formed in the body of the regulator. The valve element 36 is urged into closed position against the lip of nozzle 37 by a marginal spring 38 and is thrust away from the nozzle lip by a stem 39 that is displaced by the second-stage lever 40. This second-stage lever is supported upon inserted ball pivots 41 resting in recesses in the top surface of a partition wall 42 of the regulator body. A retaining screw 43 is provided for preventing the lever 40 from accidentally falling out of the pivot recesses.

The second-stage lever 40 is actuated by a diaphragm plate 44 which is attached to a diaphragm 45 by a clamp nut 46. A second-stage adjusting spring 48 is compressed by turning a wrench 49 which rotates an adjusting screw 50, the load being transmitted through a steel ball 51 and a spring button 52. The wrench 49 is removable, so that unauthorized persons may be prevented from altering the setting of the regulator.

The second-stage chamber of the regulator is somewhat divided up and is designated by the reference characters 54 applied to the different communicating compartments of the second-stage chamber. It is a feature of the invention that the second-stage chamber is separated from the first-stage chamber 23 by the diaphragm 11, and that the space immediately adjacent the diaphragm is separated from the remainder of the second-stage chamber by the partition wall 42 in which is a feed-back opening 56 that is small enough to throttle the flow of gas into and out of the space immediately above the diaphragm 11. The effect of this small opening 56 is to delay the changes in pressure that occur in the gas immediately above the diaphragm in response to pressure changes on the other side of the wall 42. The difference in phase of the pressure variations in the second-stage chamber on different sides of the baffle wall 42 tends to stabilize the first-stage operating mechanism.

Gas that flows through the nozzle 37 into that part of the second-stage chamber 54 that is in direct communication with the first-stage chamber and with the regulator discharge, cannot enter the space below the diaphragm 45 except by passing through a feed-back opening 58 in another partition wall of the second-stage chamber. This opening 58 restricts the gas flow sufficiently to cause a phase lag between the pressure changes caused by flow of gas to the delivery line 59 and the resulting pressure changes in the space of the second-stage chamber immediately below the diaphragm 45. It will be evident that the size of the opening 58 depends upon the volume of the space under the diaphragm 45, a larger opening producing the same phase lag with a large volume of gas that a small opening produces with a small volume of gas. This feedback opening 58 tends to stabilize the second-stage operating mechanism. The feed-back openings 56 and 58 are of different size, and with due consideration to the volumes of the gas spaces with which they communicate and the masses of the moving parts in both valve mechanisms, they are proportioned such that the pressure changes at diaphragms 11 and 45 are in a phase relationship that minimizes the tendency of the regulator valve mechanisms to vibrate or "hunt" as a result of the vibration of one valve augmenting the vibration of the other. In the illustrated embodiment of the invention the feed-back openings 56 and 58 are in series, which further affects the differences in the phase lag of the pressure changes in the gas adjacent the respective diaphragms.

In order to limit the pressure differential across the diaphragm 11 a passage 61 is provided leading directly from the first-stage chamber 23 to the space of the second-stage chamber immediately above the diaphragm 11. This passage 61 is commanded by a relief valve 62 loaded by a spring 63 that prevents the relief valve 62 from opening until the pressure differential at opposite ends of the passage 61 reaches a predetermined value. The gauge pressure within the regulator is limited by another relief valve 65 that is held in closed position by a spring-pressed ball 66. The relief valve 65, when open, permits gas to exhaust from the regulator to the surrounding atmosphere.

Gauge connections 68 are provided for both the first and second-stage chambers. The regulator illustrated has direct and inverse type regulator mechanism for the first and second stages, respectively, but the invention is not limited to regulators involving that combination. Various changes and modifications can be made, and some features of the invention can be used without others.

I claim:

1. A two-stage pressure regulator comprising a body in which is a first-stage chamber, a valve element, a diaphragm subject to high frequency pressure changes and forming at least a part of a wall of said chamber, motion-transmitting connections between the diaphragm and the valve element, a second-stage chamber on the side of the diaphragm opposite to the first chamber, and a wall separating that part of the second-stage chamber next to the diaphragm from the remainder of said second-stage chamber, said wall having an opening through which the separated spaces of the second-stage chamber communicate with one another, and said opening being of such small cross-section in proportion to the volume of the part of the second-stage chamber next to the diaphragm that it produces a substantial phase lag that tends to neutralize high frequency pressure changes on the opposite side of the diaphragm and to prevent humming of the regulator.

2. In a two-stage regulator, a body in which are reduced-pressure chambers for the first and second stages of regulation, a diaphragm subject to high frequency pressure changes and located between said chambers and exposed on opposite sides to pressure of gas from said chambers, a valve element, motion-transmitting connections between the valve element and said diaphragm, a partition in one of said chamber protecting one side of the diaphragm from the direct action of the gas in the remainder of that chamber, said partition having a small opening therein that throttles the flow of gas from and to the space between the diaphragm and the partition and causes a substantial phase lag that tends to neutralize high frequency pressure changes on opposite sides of said partition and to prevent humming of the regulator.

3. In a two-stage regulator having a reduced-pressure chamber for the first stage, a reduced-pressure chamber for the second stage, a flexible diaphragm exposed to the pressure of the second-stage chamber, a passage for the flow of gas from the first to the second-stage chamber, a valve that opens against the first stage pressure for commanding said passage, valve-operating means connecting the diaphragm and valve, a second passage between the first and second-stage chambers, and a loaded relief valve commanding said second passage and opening toward the second-stage chamber for limiting the excess of pressure in the first-stage chamber over that of the second-stage chamber.

4. In a two-stage pressure regulator including pressure-responsive valve means for controlling the supply of gas to a first-stage chamber, other pressure-responsive valve means including a valve element that opens against the pressure of the first-stage chamber for controlling the flow of gas from the first to a second-stage chamber, a relief valve exposed on opposite sides to pressure in the first and second-stage chambers, a spring pressing on the relief valve in the same direction as the gas of the second-stage chamber to hold the relief valve closed until the pressure differential between the first and second stages exceeds a given value, and a second loaded relief valve for one of said chambers opening to the atmosphere for limiting the excess of pressure in the regulator over that of the atmosphere.

5. Pressure regulator apparatus including direct-type regulator mechanism for a first stage of pressure regulation, inverse-type regulator mechanism for a second stage of pressure regulation, a passage connecting a first-stage chamber with a second-stage chamber, a relief valve in said passage, said valve opening toward the second-stage chamber and being of such a nature that it is opened by a given excess of pressure in the first-stage chamber over that in the second-stage chamber, a spring loading the relief valve to determine the pressure differential at which the relief valve opens, and a second relief valve opening from one of said chambers to the outside atmosphere.

6. A regulator including a reduced-pressure chamber, a valve that controls the entrance of gas into said chamber, a flexible diaphragm forming a part of the wall of the chamber and subject to high frequency pressure changes, motion-transmitting connections between the valve and the diaphragm through which the diaphragm controls the operation of the valve to admit gas to the chamber, and means for stabilizing the operation of the valve and diaphragm including a chamber behind the diaphragm and a small conduit through which gas from said reduced-pressure chamber flows to and from the chamber behind the diaphragm, the cross-section of said conduit being so correlated with the volume of the chamber behind the diaphragm as to produce a substantial phase lag that tends to neutralize high frequency pressure changes on opposite sides of the diaphragm, and to prevent humming of the regulator parts.

7. A pressure regulator including a valve element, pressure-responsive means for operating the valve element including a diaphragm exposed to the gas pressure within a chamber of the regulator, and means for damping vibrations of the diaphragm, said means comprising a resilient friction brake element, a guide surface against which the brake element is compressed and along which said brake element is movable, motion-transmitting connections between the friction brake and the diaphragm, and a partition separating the space immediately adjacent the diaphragm from the remainder of said chamber, said partition having a hole therein of such restricted cross-section that it throttles the flow of gas to and from said space immediately adjacent the diaphragm and cooperates with the friction brake element to cause a consequential phase lag in high frequency pressure changes on opposite sides of the partition.

8. In a two-stage regulator having first and second-stage chambers, first-stage operating mechanism including a flexible diaphragm that is exposed on opposite sides to gas pressure from the first and second stages and that is subject to high frequency pressure changes, second-stage operating mechanism including another flexible diaphragm that is exposed on one side to gas pressure from the second stage, and partition walls separating the space immediately adjacent both of said diaphragms from the remainder of the second-stage chamber of the regulator, said partition walls having restricted openings therein for causing a substantial phase lag in the high frequency pressure changes immediately adjacent the diaphragms behind the corresponding pressure changes in the remainder of the second-stage chamber, which phase lag tends to neutralize high frequency pressure changes on opposite sides of the diaphragm and to prevent humming of the regulator.

9. In a two-stage regulator having first and second-stage chambers, first-stage operating mechanism including a flexible diaphragm that is exposed on opposite sides to gas pressure from the first and second stages, second-stage operating mechanism including another flexible diaphragm that is exposed on one side to gas pressure from the second stage, a first partition separating the space immediately adjacent the first diaphragm from the remainder of the second-stage chamber, and a second partition shutting off the space immediately adjacent the second diaphragm from that part of the second-stage chamber which communicates with the first-stage chamber and with the regulator outlet, said second partition having an opening therein of small cross-section for causing pressure changes in the gas adjacent the second diaphragm to lag behind pressure changes on the other side of said second partition, and the first partition also having a restricted opening through which the gas space adjacent the first diaphragm communicates with the gas space adjacent the second diaphragm, said restricted opening being of a size to cause a lag in the pressure changes beyond the first partition.

GEORGE M. DEMING.